United States Patent Office 2,752,721
Patented July 3, 1956

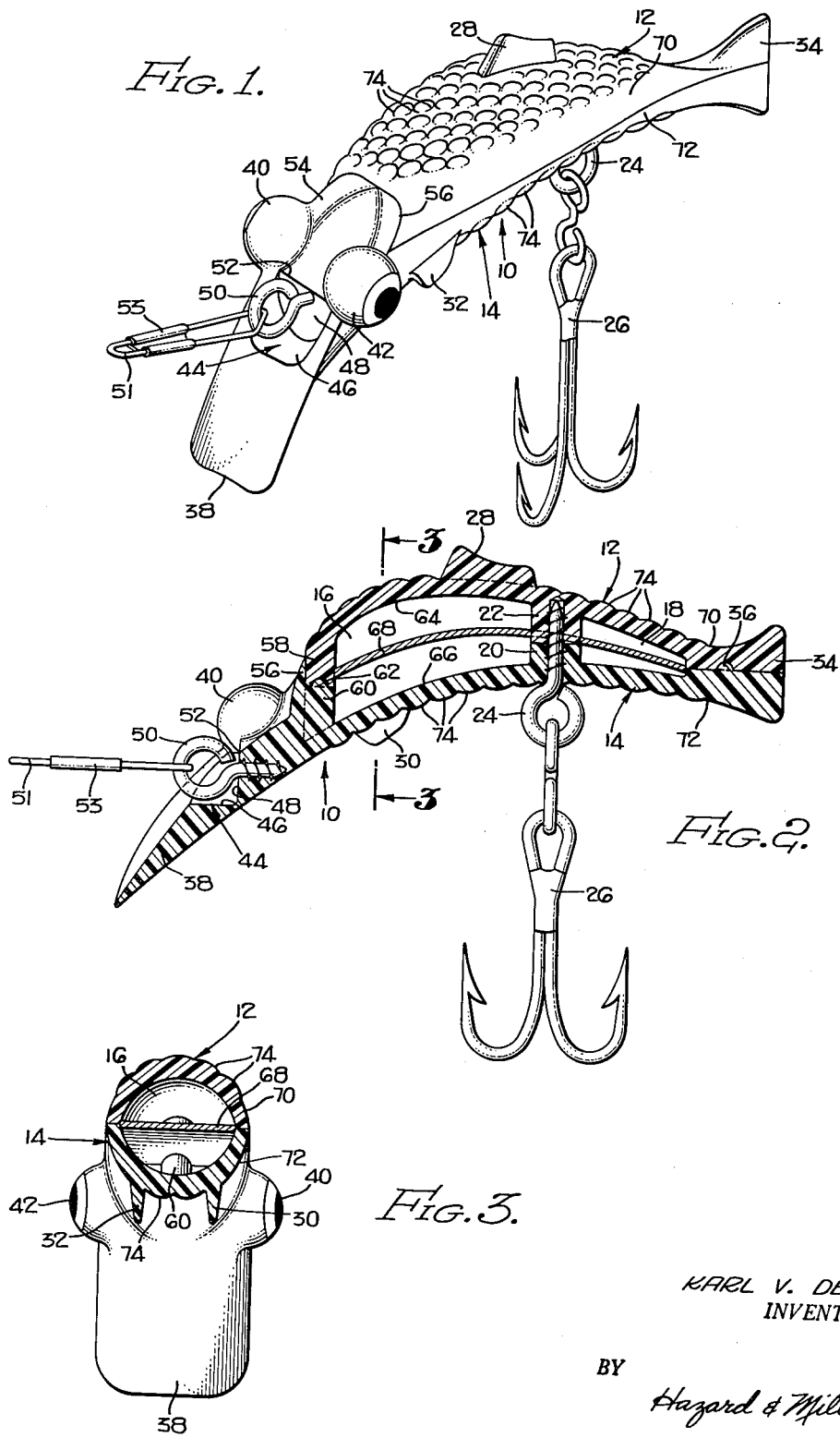

2,752,721
FISH LURE
Karl V. Denny, Los Angeles, Calif.

Application February 23, 1954, Serial No. 411,989

2 Claims. (Cl. 43—42.33)

This invention has to do with fishing equipment, and more particularly with fish lures.

Heretofore certain fish lures or plugs have utilized a reflecting medium whereby light would be reflected from the fish lure in such a manner as to cause a flashing effect which had for its purpose the attracting of fish to the lure or plug. Although the aforementioned lures and plugs occasionally accomplished the purpose, more often it was true that the flashing of reflected light accomplished the converse, i. e., the fish were frightened or detracted from the lures and plugs.

Therefore, the principal object of this invention is to provide a fishing lure having a light reflecting medium therein and a light refracting medium thereon which enables a glow to emanate from the lure as contrasted to a flash.

Another object of this invention is to provide a fish lure that has a configuration that will enable the lure to simulate the action of a live fish as it is propelled through the water.

Another object of this invention is to provide a fish lure that is economically and readily manufactured.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of the fish lure embodying the present invention;

Fig. 2 is a longitudinal cross-sectional view illustrating the position of the light reflecting medium located within the body of the fish lure; and Fig. 3 is a transverse cross-sectional view taken on the line 3—3 of Fig. 2, looking in the direction indicated.

Referring to the accompanying drawings wherein similar reference characters designate similar parts throughout, 10 broadly designates an elongated plastic body of the fish lure which is divided into two sections 12, the upper section, and 14, the lower section. These two sections, 12 and 14, are formed of a light-transmitting material and when brought together to form an integral whole are cemented, glued or otherwise secured to each other.

When the two sections 12 and 14 are assembled in the manner as viewed in Fig. 2 of the drawings, two pockets or chambers 16 and 18, having entrapped air therein, are formed which are partially divided by a boss 20 formed on the lower section and boss 22 formed on the upper section 12. Bosses 20 and 22 have for one purpose the receiving of a threaded eye screw 24 to which is swingably attached a treble fishhook 26.

Located on upper section 12 and along the longitudinal center line of the body 10 is a fin 28. In opposed relationship to fin 28 and on the bottom section 14 spaced on each side of the longitudinal center line of body 10 are a pair of fins 30 and 32.

On the rearmost portion of each section 12 and 14 is a structure when in the assembled position simulates the tail of a fish 34. On the lower section 14 and formed in that portion having to do with a tail is a detent 36 which is received by a complementary configuration formed in the upper section 12.

Integral with the lower section 14 and on the forwardmost end thereof is a polygonal-shaped duck-like bill or projection 38 that is arcuate in transverse cross-section, as may be seen by referring to Figs. 1 and 2 of the drawings. Integral with the duck-like bill 38 and spaced from the free end thereof are spherical-shaped eyes 40 and 42. Formed in the duck-like bill 38 between the free end thereof and the eyes 40 and 42 is a depression, broadly designated by 44. The surface of walls 46 and 48 of depression 44 are disposed in planes which are perpendicular to the plane of threaded eye screw 24, as may be seen by referring to Fig. 2 of the drawing.

Depression 44 has for its purpose the locating of threaded eye screw 50. In other words, depression 44 is a guide depression. Eye screw 50 receives or has attached thereto a split oblong ring 51 with a sliding clasp 53 that enables the ring 51 and clasp 53 to be readily removed from the screw 50 as may be desired. The ring 51 has attached thereto a leader which is, in turn, attached to the fishing line. As may be noted by referring to Fig. 1 of the drawings, the free end of threaded eye screw 50 is spaced from the wall 46 and positioned closely adjacent the upper edge 52 of wall 48. This particular location of eye screw 50, with the attached ring 51 and clasp 53, in the guide depression 44 is necessary in order that the maximum action of the lure may be obtained when the same is in the water.

The rearmost portion 54 of duck-like bill 38 has a lip 56 thereon which is in abutting relationship with the forwardmost wall 58 of the upper section 12.

Formed in the lower section 14 within pocket or chamber 16 and at the forwardmost end and along the longitudinal center line thereof is a boss 60 having a detent 62 thereon which is received by a complementary configuration formed in upper section 12.

Located within pockets or chambers 16 and 18 and held in place thereby by detent 62, bosses 20 and 22 and equally spaced from the interior walls 64 and 66 of sections 12 and 14, respectively, is a flat light reflecting panel or sheet of material 68. It is essential that panel 68 be equally spaced from walls 64 and 66 in order to obtain proper light refraction as will hereinafter be explained. If the panel 68 is in closer proximity to one wall than the other the refraction will be minimized and the reflection will be accentuated. Panel 68, as may be seen in Fig. 2 of the drawings, is flexible and conforms to the arcuate configuration of body 10. However, in transverse cross-section, as may be determined from Fig. 3 of the drawings, the light reflecting panel 68 is maintained flat. Panel 68 may be made of aluminum or tinfoil, or any other equally applicable material, but one of the essential properties is that it be of a highly polished surface to result in casting or reflecting a brilliant light. The panel, per se, reflects the light.

Formed on the exterior surfaces 70 and 72 of sections 12 and 14, respectively, are a multiplicity of lens-like protuberances 74 which have for their principal purpose the refracting of the reflected light in such a manner as to give the appearance that the lure glows with inner light and for a minor purpose the simulation of fish scales.

In operation, a leader attached to a fishing line is attached to ring 51, the latter, in turn, being attached to threaded eye screw 50. The lure or plug is then cast into the water and as the lure is retrieved or trolled the water being brought into contact with the duck-like bill 38 and the arcuate body 10 causes an action which is similar to that of a live fish propelling itself through the water. In other words, the body 10 moves in a rapid side to side manner similar to that of the side to side action of the tail of a live fish. As the lure moves through the water light is reflected from the panel 68 and refracted by the lens-like protuberances 74, resulting in there appearing to be an inner glow emanating from the body 10. As this inner glow appears and disappears due to the movement of the body 10, fish are attracted thereto.

Various changes may be made in the details of construction without departing from the spirit and scope of the invention as defined by the appended claims.

I claim:

1. A fish lure comprising an elongated hollow body having an elongated chamber therein, said body and chamber being longitudinally curved, and a light reflector extending longitudinally of the chamber, said light reflector being longitudinally curved but being transversely straight and having opposite sides thereof in spaced relation to walls of the body, said body having its walls opposite the sides of the reflector formed of light-transmitting material and having lens-like formations formed thereon whereby light entering the body through the lens-like formations and on being reflected by the reflector will be so dispersed as to cause the body to have a glowing appearance.

2. A fish lure comprising an elongated hollow body having an elongated chamber therein, said body and chamber being longitudinally curved, the body being divided into upper and lower sections mutually secured together, and a longitudinally curved light reflector in the chamber having its edges engaging the walls of the chamber adjacent the juncture between the upper and lower sections, said reflector extending longitudinally of the chamber and having opposite sides thereof in spaced relation to the top and bottom walls of the body and being transversely straight, said body having its walls opposite the sides of the reflector formed of light-transmitting material and having lens-like formations formed thereon on the exterior thereof whereby light entering the body through the lens-like formations on being reflected by the reflector will be so dispersed as to cause the body to have a glowing appearance.

References Cited in the file of this patent

UNITED STATES PATENTS

| | | |
|---|---|---|
| 2,008,437 | De Witt | July 16, 1935 |
| 2,078,816 | Shenitz | Apr. 27, 1937 |
| 2,598,771 | Eder | June 3, 1952 |
| 2,599,035 | Wing | June 3, 1952 |
| 2,641,862 | Poe | June 16, 1953 |
| 2,670,559 | Webb et al. | Mar. 2, 1954 |